Feb. 28, 1939. A. H. CHAMBERLAIN 2,148,606
MOUNTING FOR INDEPENDENTLY SPRUNG FRONT WHEELS OF AUTOMOTIVE VEHICLES
Filed April 28, 1937 2 Sheets-Sheet 2

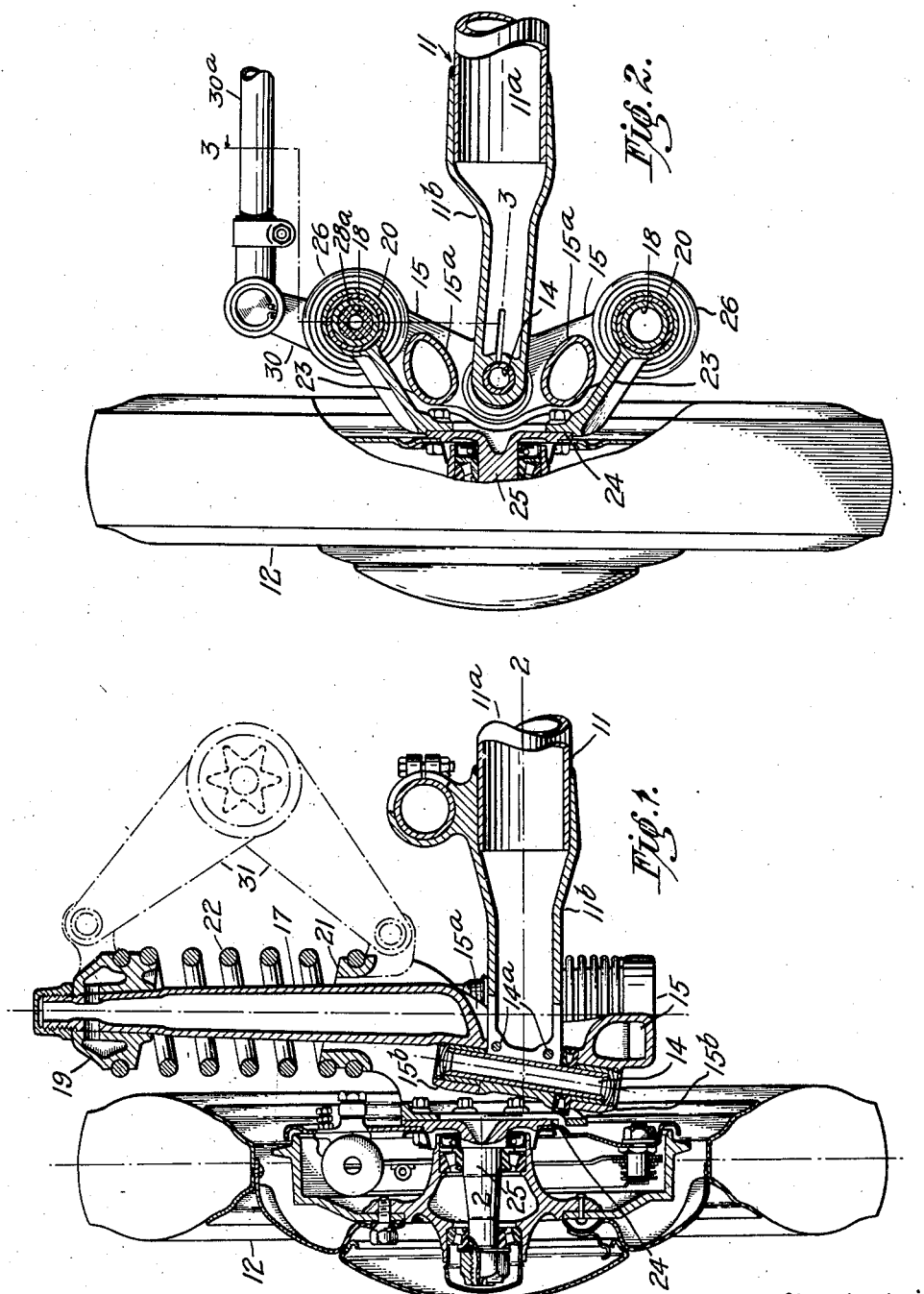

Alan Hawker Chamberlain
INVENTOR
his ATTY.

Patented Feb. 28, 1939

2,148,606

UNITED STATES PATENT OFFICE 2,148,606

MOUNTING FOR INDEPENDENTLY SPRUNG FRONT WHEELS OF AUTOMOTIVE VEHICLES

Alan Hawker Chamberlain, Brunswick, Victoria, Australia

Application April 28, 1937, Serial No. 139,426
In Australia May 8, 1936

8 Claims. (Cl. 280—96.2)

This invention relates to mountings for independently sprung front wheels of automotive vehicles, particularly mountings of the type which includes a guide that is supported relatively to vehicle framing so that it is rotatable (within limits) by steering control means, a slide which engages said guide and to which is connected an element that carries the wheel stub axle, and suspension means which resiliently resist movement of the said slide and actuate it toward normal position.

The primary object of this invention is to provide a wheel mounting of the type referred to which will withstand the stresses to which it is subjected during use more effectively than known mountings of similar type and which is robust, durable and of simple construction.

Another object of this invention is to provide a wheel mounting of the type referred to in which the guides are efficiently protected and lubricated.

An improved wheel mounting according to this invention is characterized in that the slide means and the suspension means are arranged relatively to independent members.

In the present preferred construction this improved wheel mounting includes a yoke which is pivotally mounted relatively to a king pin that is supported by a framing member, and pillars for the slide means and the suspension means supported by the said yoke. In one case the pillars comprise a central pillar for the suspension means and two guide pillars for slides, spaced equidistant at the front and rear of said central pillar. An upper bridge is fixed to the upper end of each said pillar and an intermediate bridge connects the slides and is apertured to clear the central pillar. A coiled suspension spring is arranged around the said central pillar and its upper end is anchored to the upper bridge and its lower end is anchored to the intermediate bridge. Supports extend from the said slides (and/or the intermediate bridge) to a support for the wheel stub axle.

In a modified arrangement one of the slide pillars may be omitted or it may be replaced by guide means of simple form.

Each guide is protected above and below its slide by casings which may be flexible bellows. The respective ends of the upper casing are connected to the slide and to the upper bridge and the respective ends of the lower casing are connected to the slide and to the yoke. Telescopic tubular casings may be used but in such case a longer clearance is provided. A closed air circulation system is provided and the casings are connected to it so that air may flow from a contracting casing to an expanding casing.

But in order that this invention may be more readily understood a practical embodiment thereof will now be described with reference to the accompanying drawings in which:

Fig. 1 is a vertical side section of a wheel and wheel mounting devices according to this invention.

Fig. 2 is a plan of parts in Fig. 1 partly in section on line 2—2 of Fig. 1.

Figure 3:
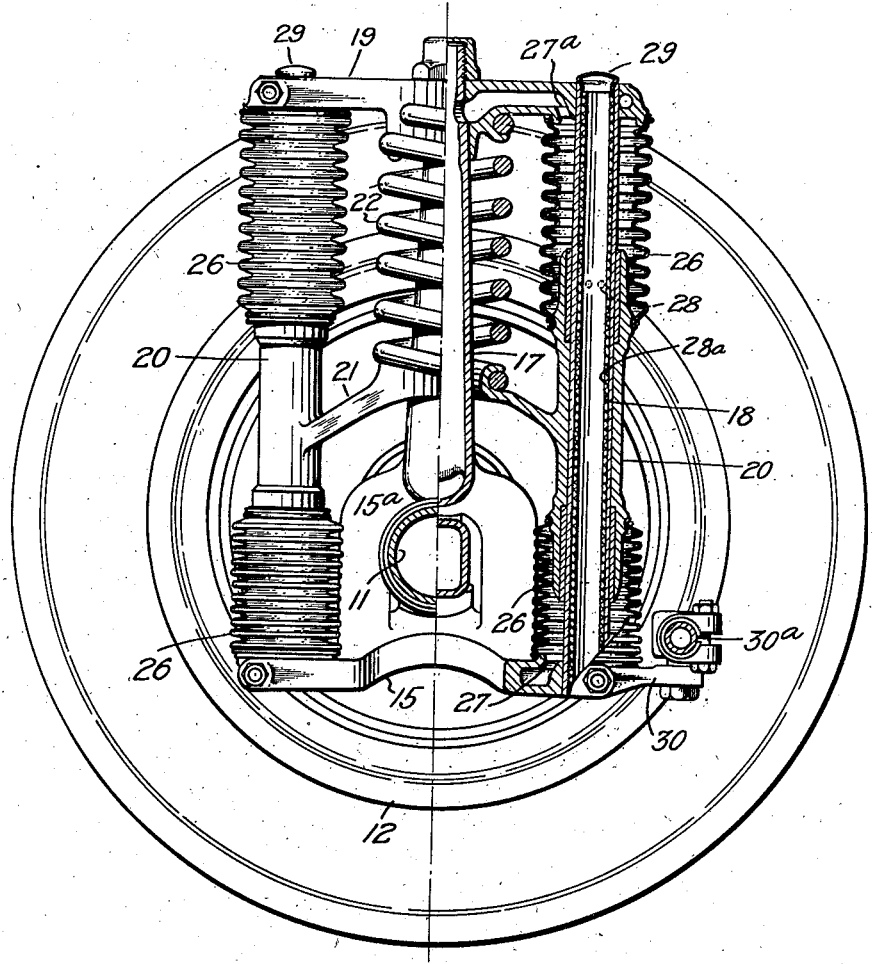
Fig. 3 is a face view at right angles to Fig. 2, partly in section on line 3—3 of Fig. 2.

In the drawings, 11 is a transverse frame member and 12 is a wheel, both of which may be of any suitable construction, that shown being by way of example and not forming part of the invention. In the form illustrated the transverse member 11 includes a cylindrical part 11$^a$ on each end of which is a contracting fitting 11$^b$ which carries a pivot or king pin 14 that is fixed in position by clamp bolts 14$^a$, for example. The said pin 14 is set obliquely according to known practice in such manner that a line projected through its axis will meet the road surface at a point adjacent to a line projected through the centre of the wheel tyre.

A yoke which comprises a base part 15 and an arch 15$^a$ is pivotally supported relatively to pin 14 by means of bosses 15$^b$. A pillar 17 extends upwardly from the top of the arch 15$^a$ and it is preferably hollow and formed integral therewith. Guide pillars 18 are rigidly fixed to the ends of the base 15 of the yoke in any suitable manner. An upper bridge 19 is fixed to the upper end of the pillar 17 and the two guides 18.

A slide 20 engages each guide pillar 18 and the slides are connected by an intermediate bridge 21 in which is a clearance for the pillar 17. The guides 18 are of such length that they provide relatively long bearing surfaces for the slides 20 with sufficient clearance above and below each slide for movement in either direction.

A heavy helically coiled spring 22 is arranged freely about the central pillar 17. The upper end of spring 22 is anchored to the bridge 19 and its lower end is anchored to the bridge 21. An arm 23 extends from each slide 20 and is rigidly fixed to an element such as a plate 24 which carries the wheel stub axle 25.

Suitable protecting means such as a flexible casing 26 of bellows form for example, is arranged about each pillar 18 above and below its slide 20. Each bellow is connected air tightly to the slide 20, the lower end of each lower bellows is air tightly connected to an end of the yoke part 15 and the upper end of each upper bellows is air tightly connected to the upper bridge 19. The yoke members 15 and 15a, the central pillar 17 and the bridge 19 are hollow. Each lower bellows 26 is connected to the interior of yoke member 15 by a port 27 and each upper bellows is connected to the interior of bridge 19 by a port 27a. When the slides move downwardly, air which is expelled by the collapsing lower bellows travels through the yoke parts 15 and 15a, upright 17 and bridge 19 into the upper bellows which are expanding; when the slides move upwardly, the air travels in the opposite direction. The air is retained in a closed system and cannot be contaminated by dust or other foreign matter which would increase wear of the bearing surfaces.

Pillars 18 are hollow and each is fitted internally with a wick or the like 28a which is saturated with lubricant that is fed therefrom through holes 28 in the pillar on to the bearing surface of a slide 20. A suitable cap as 29 is provided at the upper end of each pillar 18 to facilitate supply of lubricant to the wick from time to time.

Connections to steering means may include, for example, an arm as 30 and a tie rod as 30a. Shock absorbing means as 31 may be connected to a movable member such as the bridge 21 and to a fixed member such as the bridge 19.

I claim:

1. Mounting for an independently sprung front wheel of an automotive vehicle comprising a member pivotally mounted relatively to vehicle framing, guides means carried by said member, a support for the wheel stub axle arranged to slidably engage said guide means, a pillar that is independent of the guide means extending from said member, suspension means arranged relatively to said pillar, and a connection from the stub axle support to said suspension means.

2. Mounting for an independently sprung front wheel of an automotive vehicle comprising a member pivotally mounted relatively to vehicle framing, a plurality of guides carried by said member, a slide on each guide, a connection from each slide to an element that carries the wheel stub axle, a pillar extending from said member, resilient suspension means arranged about said pillar and means to connect each slide to said suspension means.

3. Mountings for independently sprung wheels as claimed in claim 2 characterized by a collapsible or telescopic casing about each guide above and below its slide, means to air tightly seal the ends of each said casing and connections between the casings to permit air to travel in a closed circuit from a collapsing casing to an expanding casing.

4. Mountings for independently sprung wheels of automotive vehicles of the type which include guide means pivotally supported relatively to vehicle framing, a slide to engage the guide, a connection from the slide to an element that supports a stub axle and suspension means to resiliently resist displacement of the slide, characterized in that the guide means comprises a plurality of stems each carrying a slide, a pillar for spring suspension means, a transverse intermediate bridge connecting the said slides, a transverse upper bridge connecting the upper ends of the said guides and the said pillar and a helically coiled suspension spring arranged about the said pillar and means to connect the upper end of said spring to the upper bridge and lower end of said spring to the intermediate bridge.

5. A mounting for an independently sprung wheel of automotive vehicles comprising a yoke pivotally mounted relatively to a transverse frame member, three pillars comprising a central pillar and two guide pillars arranged one at each side of said central pillar extending from said yoke, a slide engaging each guide pillar, a connection from each slide to an element that carries a stub axle, an intermediate bridge connecting the said slides, an upper bridge connecting the upper ends of the said pillars, a helical spring about the central pillar and means to connect the upper end of the said spring to the upper bridge and the lower end of the said spring to the intermediate bridge.

6. A mounting for an independently sprung wheel for automotive vehicles comprising a yoke pivotally mounted relatively to the vehicle framing, three pillars comprising a central pillar and two guides pillars extending from said yoke, a slide engaging each guide pillar, a connection from each slide to an element that carries a stub axle, an intermediate bridge connecting the said slides, an upper bridge connecting the upper ends of the said pillars, a helical spring about the central pillar, means to connect the upper end of the said spring to the upper bridge and the lower end of the said spring to the intermediate bridge, a casing about each guide above and below its slide, and passages connecting the upper and lower casings so that air passes in a closed circuit from a collapsing casing to an expanding casing.

7. A mounting for independently sprung wheels as claimed in claim 6 characterized in that the passages connecting the upper and lower casings are formed in the yoke, the central upright and the upper bridge.

8. A mounting for independently sprung wheels as claimed in claim 6 characterized in that each guide is hollow and contains a wick from which lubricant is fed through holes to the bearing surface of a slide.

ALAN HAWKER CHAMBERLAIN.